(12) United States Patent
Teh et al.

(10) Patent No.: US 11,954,629 B2
(45) Date of Patent: Apr. 9, 2024

(54) ACTIVATION POLICIES FOR WORKFLOWS

(71) Applicant: Salesforce, Inc., San Francisco, CA (US)

(72) Inventors: Peh Keong Teh, Carmel, IN (US); Gautam Dharamshi, Redmond, WA (US); Jon R. Helms, Mandeville, LA (US)

(73) Assignee: Salesforce, Inc., San Francisco, CA (US)

( * ) Notice: Subject to any disclaimer, the term of this patent is extended or adjusted under 35 U.S.C. 154(b) by 669 days.

(21) Appl. No.: 17/111,502

(22) Filed: Dec. 3, 2020

(65) Prior Publication Data

US 2021/0089351 A1 Mar. 25, 2021

Related U.S. Application Data

(63) Continuation of application No. 16/171,351, filed on Oct. 25, 2018, now Pat. No. 10,891,159.

(60) Provisional application No. 62/735,844, filed on Sep. 24, 2018.

(51) Int. Cl.
  *G06Q 10/0633* (2023.01)
  *G06F 9/48* (2006.01)
  *G06F 9/50* (2006.01)

(52) U.S. Cl.
  CPC ....... *G06Q 10/0633* (2013.01); *G06F 9/4881* (2013.01); *G06F 9/5038* (2013.01); *G06F 9/5066* (2013.01)

(58) Field of Classification Search
  CPC ..... G06F 9/4881; G06F 9/5038; G06F 9/5066
  See application file for complete search history.

(56) References Cited

U.S. PATENT DOCUMENTS

| 8,549,536 B2 | 10/2013 | Vasil et al. |
| 8,744,890 B1 * | 6/2014 | Bernier .......... G06Q 10/063116 705/7.17 |
| 8,869,165 B2 * | 10/2014 | Dasgupta .............. G06F 9/5038 718/106 |
| 11,070,511 B2 * | 7/2021 | O'Brien .............. H04L 61/5007 |
| 2011/0161284 A1 * | 6/2011 | Tewari ................ G06F 16/2365 707/694 |

(Continued)

OTHER PUBLICATIONS

Cai et al., "Resource Provisioning for Task-Balch Based Workflows with Deadlines in Public Clouds", 2017, pp. g14-g826, IEEE Transactions on Cloud Computing, vol. 7, No. 3, Jul.-Sep. 2019.

(Continued)

*Primary Examiner* — Jacob D Dascomb
(74) *Attorney, Agent, or Firm* — Nicholson, De Vos, Webster & Elliott, LLP

(57) ABSTRACT

Activation policies for workflows are described. Some implementations support receiving a definition of a workflow, including data defining an input set for the workflow and data defining activities and a flow of the activities for the workflow. The data includes an activation policy for at least a particular activity of the activities. An estimated operational outcome for the workflow and/or each of the activities is determined and displayed. Then data identifying edits to the activation policy are received, and an updated version of the estimated operational outcome for the workflow and/or each of the activities is determined and displayed.

12 Claims, 8 Drawing Sheets

(56) References Cited

U.S. PATENT DOCUMENTS

2013/0179208 A1* 7/2013 Chung ............... G06Q 10/06
                                                    705/7.15
2019/0146840 A1   5/2019 Helms
2019/0196885 A1   6/2019 Song et al.

OTHER PUBLICATIONS

Jacobs J., et al., "Get Started on Creating Great Customer Experiences with Journey Strategies," Digital Clarity 3roup, 2017, 16 pages.
Non-Final Office Action, U.S. Appl. No. 16/171,351, dated Jun. 30, 2020, 7 pages.
Notice of Allowance for U.S. Appl. No. 16/171,351, dated Sep. 10, 2020, 9 pages.
Restriction Requirement, U.S. Appl. No. 16/171,351, dated Apr. 17, 2020, 5 pages.
Salesforce, "Automation Studio," Winter '19, Sep. 17, 2018, 152 pages.
Salesforce, "Blazing New Trails," 2018, 1 page.
Salesforce, "Customer Journey Worksheet Set," 2018, 10 pages.
Salesforce, "Journey Builder," Winter '19, Sep. 17, 2018, 139 pages.

* cited by examiner

ACTIVATION POLICIES FOR WORKFLOWS

CROSS-REFERENCE TO RELATED APPLICATIONS

This application is a divisional of application Ser. No. 16/171,351, filed Oct. 25, 2018, which claims the benefit of U.S. Provisional Application No. 62/735,844, filed Sep. 24, 2018, which are hereby incorporated by reference.

TECHNICAL FIELD

One or more implementations relate to the field of workflows; and more specifically, to the configuration and execution of workflows by an electronic device.

BACKGROUND ART

A workflow tool allows for the creating, managing, and executing of workflows. The workflow tool supports workflows that each include a plurality of activities and an order with which those activities are to be performed. Workflow tools support workflows for which the input will be defined such that it includes a set of one or more items (e.g., which may represent and be referred to as physical items, persons, consumers, users, the audience) that will start at the first activity of the flow. Where such a set includes multiple items, the set is also referred to as a group and the items referred to as members of the group. A workflow tool may support different types of activities with actions, such as: 1) one or more types of activities may include actions that cause something to occur (e.g., an action that causes the sending of an email is sometimes referred to as a send action); 2) one or more types of activities may include actions that require a set of one or more conditions be met before moving on to the next activity in the workflow (e.g., an action that causes a wait until the sent email has been opened is sometimes referred to as a wait action); and 3) one or more types of activities may include actions that cause branching of the workflow (sometimes, this type of activity is referred to as a decision activity and it has what is sometimes referred to as a decision action).

For example, Journey Builder (JB) (by Salesforce.com, Inc.) is a workflow tool that delivers personalized cross-channel brand to consumer journey management. It supports the defining of a set of one or more consumers for a workflow, where each consumer moves through the workflow at his/her own pace (referred to as a singleton type workflow tool). In other words, in a singleton type workflow tool, resources are used to process each item through the workflow individually.

By way of another example, Automation Studio (by Salesforce.com, Inc.) is a bulk workflow tool able to batch-send related scenarios (Automation Studio Email activity) at scale to do a batch campaign. In a bulk type workflow tool, the input set to the first activity generally moves through the workflow as a set (with the exception that some activities may filter out items such that the input set to a next activity in the workflow is a subset of the items in the input set to the prior activity). In other words, the members of the input set move through the activities of the workflow in lock step as the entire group is a single batch. An implementation of a bulk type workflow tool controls the processing of activities using a state machine (when a job processing the current activity completes, a job to process the next activity is started), and stores in a database the data/items to minimize data movement and the current state, which state is updated to indicate which activities turn it is be processed. Thus, when there are multiple items in the input set to a workflow (and thus, input to the first activity of the workflow) in a bulk type workflow tool, each activity in the workflow will expect to receive an input set of one or more items, where the input set to an activity following the first activity in the workflow may be all of the input set to the workflow or a subset (if some items were filtered out of the input set by a prior activity). The items filtered out at a given activity are dropped. Comparing a bulk workflow tool to a singleton workflow tool, a bulk workflow tool makes more efficient use of resources because it is not managing multiple different items moving through the workflow at their own pace and because it gains from economy of scale by performing the same operation on all members at the same time instead of processing several differing operations on one member at a time.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1A:
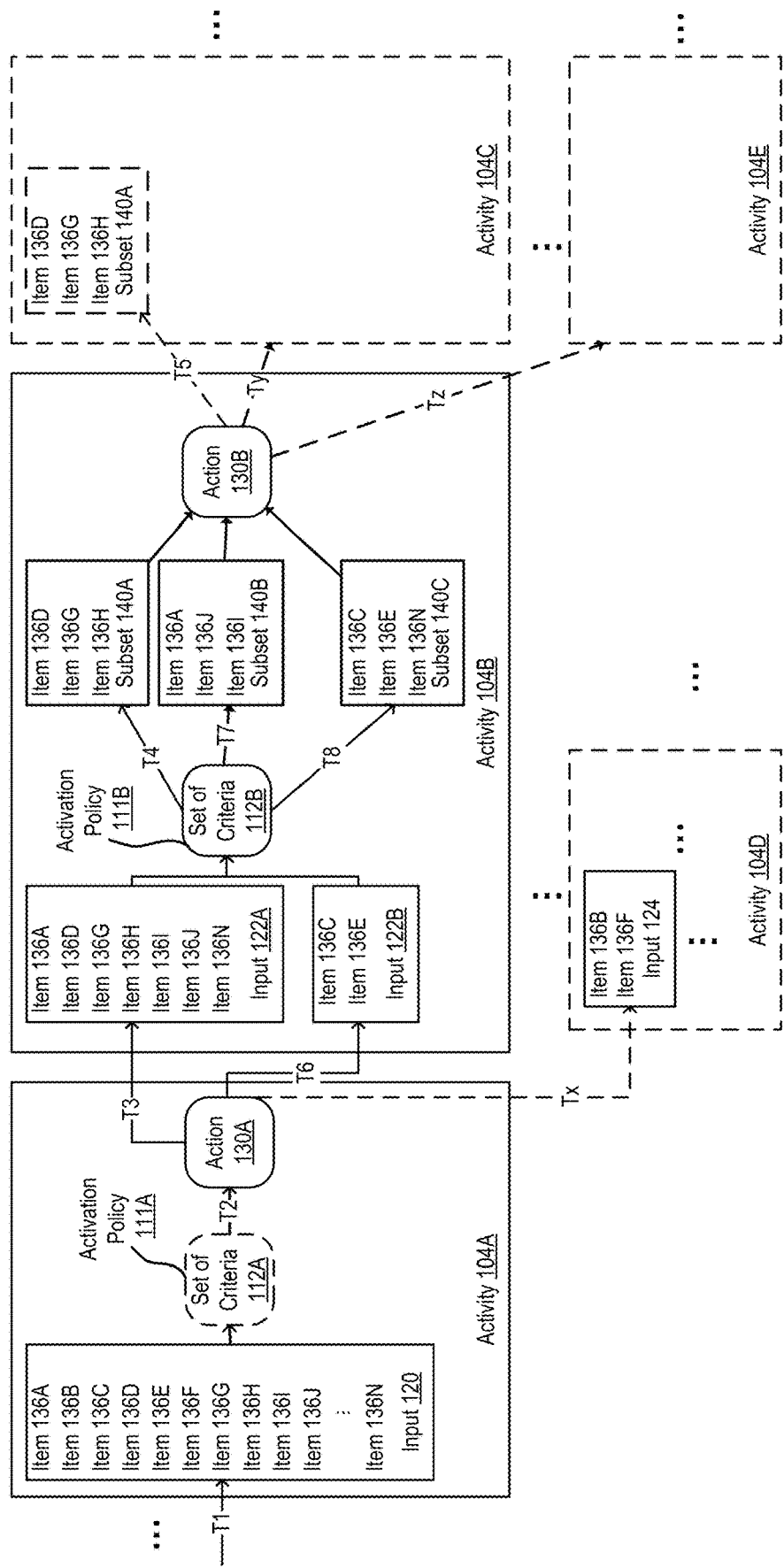
FIG. 1A is a block diagram illustrating part of a workflow according to some exemplary implementations.

The following description describes workflow tools and workflows. Some implementations are described that support the configuring of a workflow such that an activity in the workflow can start processing items on which a prior activity's processing is completed, but before the prior activity has completed processing all the items. In addition, this activity can be configured to group the items received so far into a subset and process it according to the action of the activity and then send it to a next activity; and the activity can be configured to repeat this process multiple times using the items that have been received since the previous subset. This repetition (also referred to as recurrence) means that, relative to the input set to the workflow, there may be multiple subsets of the items from that input set at different points in the workflow. In other words, the input set to an activity may be received over time (an individual item at a time or in subsets), and the processing of that activity may also result in that input set being split into subsets that are provided over time to a next activity. By way of example, some implementations support the inclusion of a set of one or more criteria (also referred to as a set of trigger criteria, a set of activation criteria, or a set of "catch and release" criteria; also collectively referred to as a "policy," a "trigger policy," an "activation policy," or a "catch and release policy") for such an activity in a workflow, where the set of criteria, when met, may result in the input set that will be provided to the activity being broken into at least a first and second subsets, where: 1) the action of the activity is performed on the first subset and then passed to a next activity of the workflow; and 2) the second subset is received and processed later.

It should be noted that the terms input set and subset are used contextually and are relative terms. For instance, there is an input set for the whole workflow, and there is an input set for each activity of the workflow. Also, a given activity may process the items in its input set in subsets and output them to a next activity. Thus, a next activity may receive its input set in the form of multiple of these subsets over time, and that next activity may be configured with its own activation policy, which may be configured in different ways such that is causes the next activity to process the subsets it receives in different ways—such as: 1) process each as a separate subset; 2) process mergers of one or more of the subsets into a larger subset; 3) process a merger of all the received subsets as a single set; and/or 4) process subsets that are mixtures of items from one or more subsets. Different implementations may support more, less, and/or different ways the next activity can be configured (e.g., an implementation may support configuring a next activity in one of ways 1-3, but not 4). While the terms items, input set and subsets will be used later herein, these concepts may also be respectively referred to as: 1) members, audience members, or group members; 2) input group, input chunk, input batch, or audience group; and 3) subgroups, chunks, batches, or audience groups.

Thus, some implementations provide the ability for a next activity to: 1) process an item as soon as its processing is completed by the current activity; or 2) process a batch of items whose processing is completed by the current activity for: a) optimal performance; and/or 2) to meet a certain use-case (i.e., regardless of speed/throughput, do not process the activity until after a scheduled time). Such implementations provide advantages in that the workflow tool can support: 1) higher throughput than a singleton type workflow tool (in which each item travels the workflow at its own pace) because, in the implementations described herein, subsets with multiple items can move through the workflow together; and 2) lower latency than a bulk type workflow tool (in which there can be a delay because there are items in the input set that are not ready to move to the next activity or are not yet to be filtered and dropped) because, in the implementations described herein, subsets of the items can be picked up for processing by a next activity earlier. These advantages in turn allow a system to: 1) manage larger volume workflows, more workflows, and/or longer workflows; 2) reduce latency in processing workflows; and/or 3) use fewer resources to process workflows. Put another way, implementations allow for the configuration of activities of a workflow such that the input set to the workflow may be chunked as it moves through the workflow, hence creating a pipeline of bulk processing of the chunks allowing for improved throughput. Such implementations can scale better than singleton type workflow tools.

Activities in a Workflow

FIG. 1A is a block diagram illustrating part of a workflow according to some example implementations. The workflow 100 includes an activity 140A, an activity 104B, and optionally other activities (e.g., activities 104C-E). The activity 104A: 1) may include an activation policy 111A with a set of one or more criteria 112A; and 2) includes an action 130A. The activity 104B includes: 1) an activation policy 111B with a set of one or more criteria 112B; and 2) an action 130B. Different implementations may support one or more forms of criteria, such as: 1) activate according to a schedule (which may include a time, day of the week, day of month, etc.); and 2) activate after an event—such as a predefined amount of time has passed and/or a threshold number of items.

For example, assume that the activity 104A receives as an input set the input 120, which includes exemplary items 136A-N, and assume that the activation policy 111A is configured as activate according to a schedule, then at the scheduled time T2 the activity starts performing the action 130A on the items 136A-N. The action may be completed more quickly for some of the items 136A-N than others. By way of example, this is illustrated in FIG. 1A in that: 1) the items A, D, G, H, I, J, and N are provided to activity 104B at time T3; and 2) the items C and E are provided to the activity 104B at time T6. FIG. 1A also illustrates that the action 130A may be configured such that it may cause a branch such that some of the items (e.g., 136B and F) are provided to a different activity (e.g., activity 104D), and the time is shown as Tx because it could happen at different times relative to those already shown.

In some implementations, the set of criteria can be thought of as defining a set of one or more triggering moment(s) to "catch" some of the items in the input set and "release" them for performance of the action of the activity and then delivery to a next activity in the workflow; while any items in the input set that were not included in the catch will be acted on later by the activity. Put another way, the set of criteria can be thought of as indicating when to "release," and until that set of criteria is met any items received are being "caught" and held. Put yet another way, implementations support the configuration of an activity such that its execution will repetitively catch and release in groups (where each group is a subset of the items in the input set that the activity will receive). This is also sometimes referred to as a recurring catch. For example, in FIG. 1A, the set of criteria 112B is configured such that the input set (which includes items A, C-E, and G-N) is split into three subsets at three different times—at time T4 the items 136D, G, and H are caught in subset 140A and released to the action 130B; at time T7 the items 136A, J, and I are caught in subset 140B and released to the action 130B; and at time T8 the items 136C, E, and N are caught in subset 140C and released to the action 130B. FIG. 1A also illustrates that the action 130B may be configured such that it may result in providing the items to an activity 104C at different times (for example, some at time T5 and others at Ty) and/or cause a branch in the workflow such that some of the items are provided to a different activity (e.g., activity 104E) at time Tz. Here time T5 is an example that illustrates the pipeline nature that can result from the catch and release policy mechanism—namely, items 136D, G and H may make it to activity 104C before items C and E make it at time T6 to activity 104B because of the throughput of action 130A.

By way of example, assume the set of criteria 112B is configured to activate after a threshold number of 3 items, then each time the set of criteria is met (e.g., the threshold number of items has been received) that subset of items is released to be acted upon by the action 130B and then provided to a next activity. By way of another example, assume the set of criteria 112B is configured to activate after a predetermined amount of time has passed, then a timer is started upon receipt of a first item by the activity 104B and when the predetermined amount of time has passed the items received to that point form a subset of items that is released to be acted upon by the action 130B and then provided to a next activity. By way of example, assume the set of criteria 112B is configured with boolean logic (e.g., and, or) to combine both an "activate after a threshold number of items" and "a predetermined amount of time has passed," then each time the set of criteria is met that subset of items is released to be acted upon by the action 130B and then provided to a next activity. Some implementations may support the configuring of the set of criteria for an activity with a recurrence indicator which identifies the number of times the set of criteria should be reapplied. In some such implementations, the recurrence counter can be: 1) a whole number indicating a number of times to repeat; 2) data indicating no repetition (such as zero or not applicable); and/or 3) data indicating that the repetition should continue until the workflow as a whole is terminated.

While in FIG. 1A shows, and the rest of this description uses language, suggesting that the items are being passed from one activity to another, this is to ease understanding. As such, while implementations may actually move items from one activity to another, alternative implementations may store the data/items and execution state (e.g., which items are currently being processed by which activities) in a database and just update the execution state to minimize data movement (that is, pass on an item for processing by the next activity by updating the execution state). Also, by way of example, some implementations handle the processing of subsets of items at different times using sub-jobs that are processed independently (before processing of an activity is completed, a sub-job to process a next activity may be started) and update the execution state in the database as the sub-jobs are executed.

Some implementations are designed to support marketing campaigns and can manage large volume, low latency personalized marketing campaigns (e.g., sending information to different customers using one or more communication channels to those customers); and in some implementations activities can include other business processes (e.g., commerce related activities such as checking for a credit card, buying items, and shipping items) in addition to marketing activities. The purpose is to enable batch-sending related scenarios. Such implementations may differentiate and optimize the marketing campaign workflows by batching campaign execution of subsets to achieve maximum throughput with minimal latency. Additionally, such implementations may support campaigns that are extremely large volume (e.g., an audience greater than a million, or an audience greater than double-digit millions), that are near real-time, and/or scheduled for a particular time. Put another way, singleton type workflow tools do not scale well to support millions of business to customer engagements, and bulk type workflow tools do not address latency issues when dealing with relatively large numbers of customers moving through workflows together. These problems are overcome by the implementations described herein.

Thus, in some implementations the "catch and release" mechanism precedes each activity in a workflow and provides granular control for the workflow builder (e.g., a marketer) to decide when and how the group of items (e.g., audience members) should be processed and provided to a next activity. In other words, the catch and release mechanism serves as a way for a marketer to "group the audience" before executing the next activity. While some implementations additionally have a set of criteria for the workflow itself (e.g., a collector process, ETL (extract, transform, load) processor, transaction receiver, etc.) that activates the workflow when the set of criteria for the workflow is met, other implementations do not.

Implementations may support having one, multiple, or all the activities have a separate set of one or more criteria. Additionally, or alternatively, implementations may support certain types of activities for which a set of such criteria can be defined and certain types of activities for which they cannot.

Implementations of the workflow tool support workflows for which the input set will be defined such that it includes a set of one or more items (e.g., which may represent and be referred to as physical items, persons, consumers, users, the audience) that will start at the initial activity of the flow. While implementations may support a variety of types of activities (e.g., sending communications, comparing data, waiting a period of time, branching) and differently shaped flows (e.g., flows composed of a series of activities, one after the other; flows with branching through the inclusion of branching type activities such that there is more than one path through the flow, etc.), other implementations support more, less, and/or different types of activities and differently shaped flows (e.g., only flows without branching because a branching activity is not included).

Additionally, in some implementations it is desirable to set the expectations of the builder of a workflow (e.g., marketers in the case of a workflow tool for marketing campaign management) of the estimated outcome of at least some, if not all, of the activities in the workflow against their target input set for the workflow (e.g., target audience in the case of a workflow tool for marketing campaign management). Thus, some implementations provide estimated operational outcome information that may be used by the builder of a workflow tool to modify the workflow they are building (that is modify at design time) to achieve a desired outcome. For instance, implementations of the workflow tool include a policy-driven catch and release mechanism and provide the workflow builder estimated operational outcome information and granular control on how the input set moves through the activities through editing of the catch and release policy on different ones of the activities of the workflow.

Such estimated operational outcome information may take a variety of forms (e.g., time required from the target audience to go through one, some or all of the activities and/or total time to go through the whole workflow), and such estimated operational outcome information may be caused by the workflow tool to be displayed to the builder of a workflow to allow the builder to determine if the current configuration of the workflow will meet a service level objective (SLO) for one, some, or all of the activities and/or a SLO for the workflow. In addition, the builder may use the workflow tool to modify (e.g., change the start time, change the number of items in the input set, etc.) the workflow as necessary to meet one or more objectives. Implementations in which the estimated operational outcome information includes an indication of time (e.g., an estimated amount of time to complete and/or an estimated time of completion) may do so by supporting one or more ways to estimate the required time. By way of example, one way (which may be used when no workflow history is available) is a throughput/ performance estimation, which is based on the throughput of similar activities (in other words, a static estimate for each activity that was computed based on internal tests and/or real-time data that was aggregated from other similar activities). Another exemplary way (which may be used when workflow history is available) is a workflow specific performance estimation (also referred to as a custom workflow performance estimation), which is based on the actual workflow performance estimates based on their historical data. An estimate of time may be based on an estimated throughput of items through the activities and estimated number of items in the input. For instance, a calculation of complexity (e.g., estimated number of items in the input set to the workflow, size of content when sending out content, % of items that will meet conditions of the activities, duration of any wait type activities, etc.) may be used to estimate throughput and an amount time to complete, and optionally an end time based upon a start time.

Some implementations: 1) support configuration of a "safe range" within which the estimated operational outcome may be determined; and 2) cause an indication to be displayed to the builder if the current configuration of an activity and/or workflow is outside of the "safe range." Additionally, or alternatively, some implementations have at least some types of activities that come configured with a "smart default" to simplify the builder's experience.

Thus, a workflow may be configured such that: 1) one activity passes its input set of items to only one next activity; and/or 2) another activity (e.g., a decision activity) may cause different ones of its input set of items to be sent to different next activities. Regardless, the set of criteria may be configured such that it may cause two or more subsets to be sent to a same next activity but at different times because of the recurring catch and release policy. Thus, a decision activity may cause different ones of its input set of items to be sent to different next activities, and depending on what an implementation supports: 1) the different next activities may have a same set of criteria; 2) each of the different next activities may have a different set of criteria; 3) one or more of the different next activities may have a same set of criteria and one or more of the different next activities may have a different set of criteria; etc. Again, regardless, a given set of criteria may be configured such that it may cause two or more subsets to be sent to a same next activity but at different times because of the recurring catch and release policy.

Figure 1B:
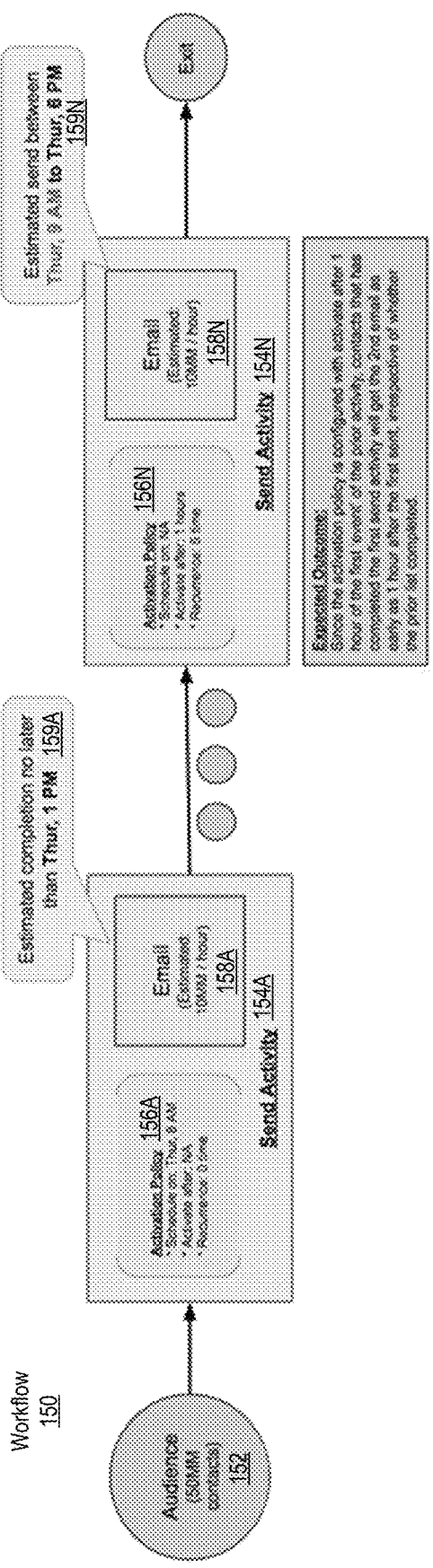
FIG. 1B is a block diagram illustrating part of another workflow according to some exemplary implementations.
Figure 1D:
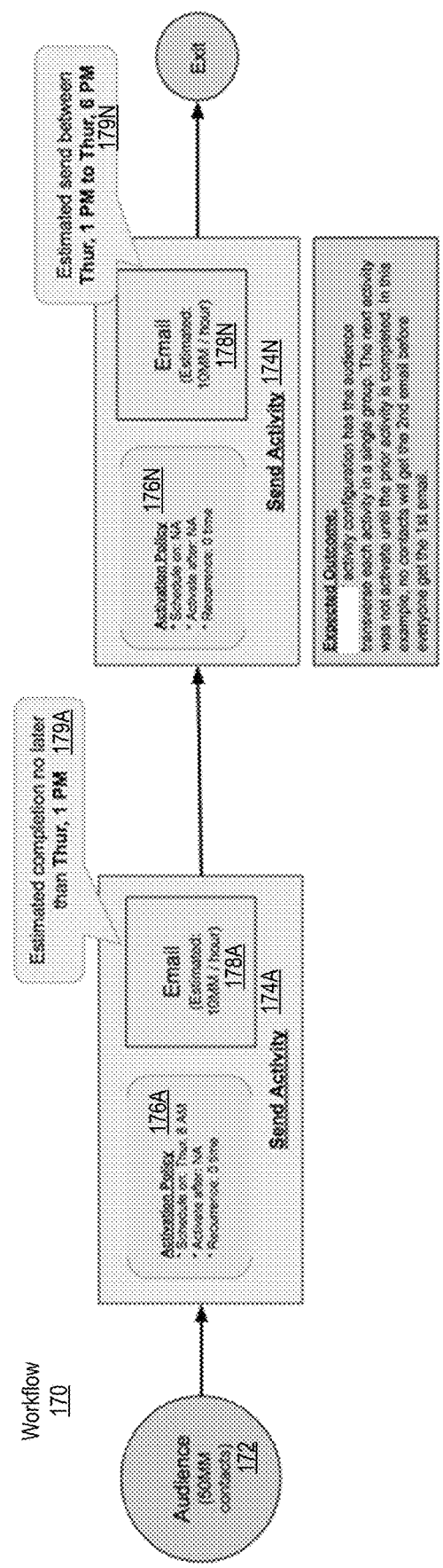
FIG. 1D is a block diagram illustrating another workflow according to some exemplary implementations.
Figure 1C:
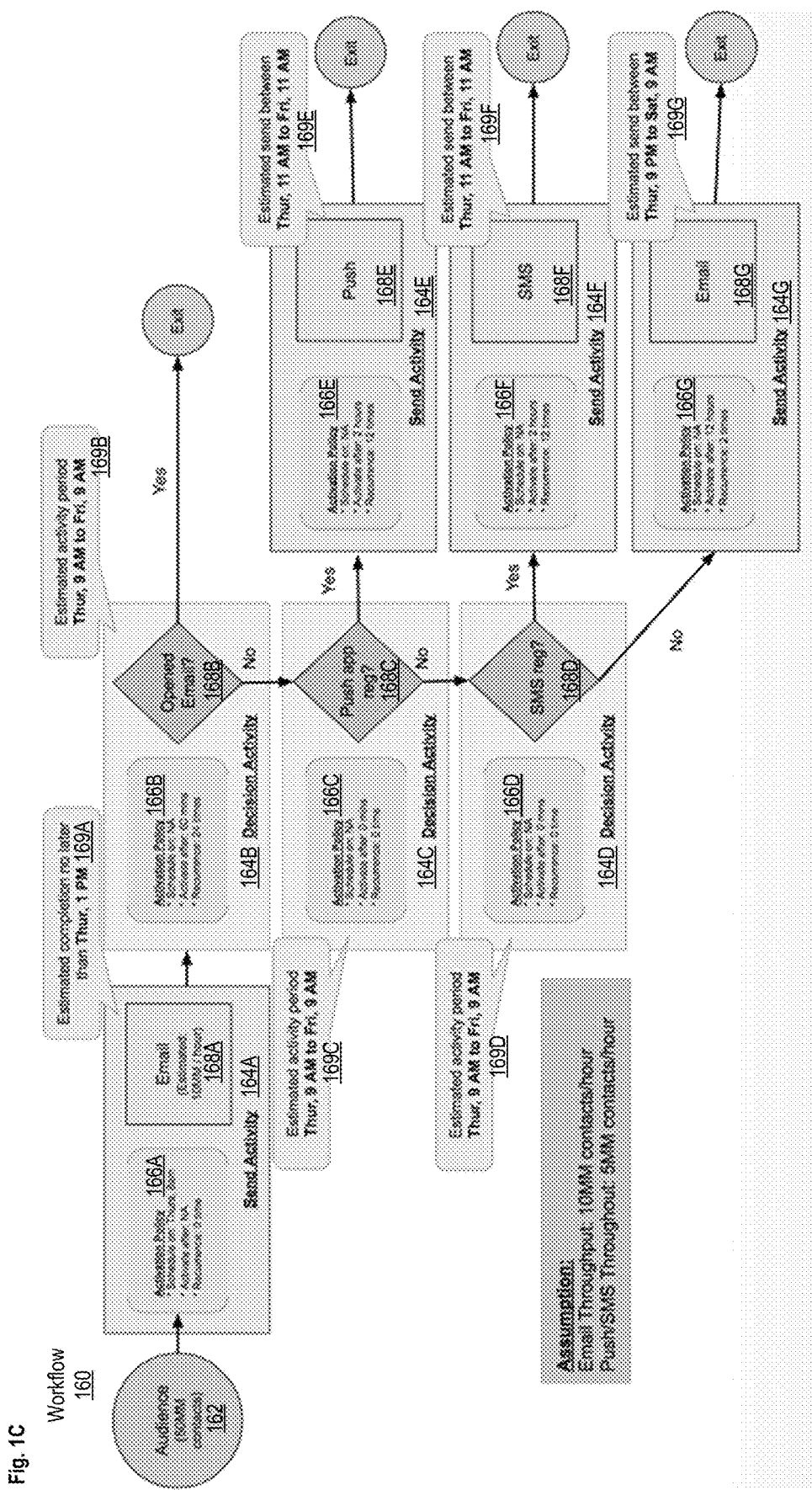
FIG. 1C is a block diagram illustrating part of another workflow according to some exemplary implementations.
Figure 1E:
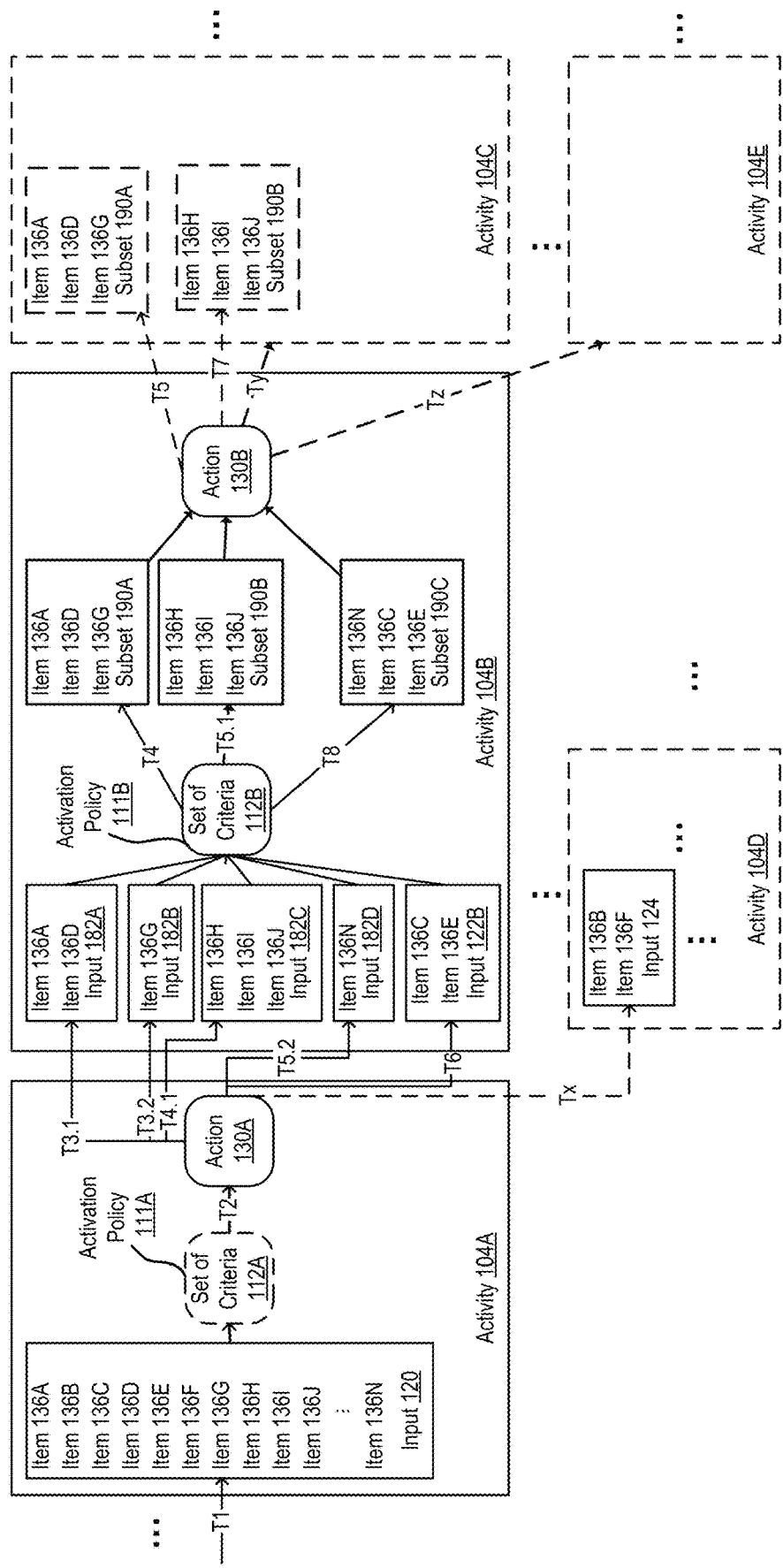
FIG. 1E is a block diagram illustrating part of a workflow according to some example implementations.

FIG. 1E is a block diagram illustrating part of a workflow according to some example implementations. The workflow 180 is the same as workflow 100, except: 1) the timing of receipt of the items 136A, D, G, H, I, J, and N by activity 104B (namely, items 136A and D at time T3.1; item 136G at time T3.2; items 136H, I, and J at time T4.1; and item 136N at time T5.1); 2) the timing and splitting of the input set occurring in activity 104B (at time T4 the items 136A, D, and G are caught in subset 190A and released to the action 130B; at time T5.1 the items 136H, I, and J are caught in subset 190B and released to the action 130B; and at time T8 the items 136N, C, and E are caught in subset 190C and released to the action 130B); 3) the subset 190A including items 136A, D, and G make it to the activity 104C before items 136N, C and E make it at times T5.1 and T6 to activity 104B because of the throughput of the actions 130A and 130B; and 4) the subset 190B including items 136H, I, and J make it to the activity 104C before items 136N, C and E make it at time T8 to the action 130B of the activity 104B because of the throughput of the actions 130A and 130B. In this example, the set of criteria 112B may be either: 1) activate after a time (e.g., intervals falling after T3.2, T4.1, and T6 to respectively form subsets 190A-C; put another way, intervals falling at T4, T5.1, and T8 to respectively form subsets 190A-C); or 2) number of items (e.g., three— meaning that: subset 190A is generated responsive to receipt of the item 136G by activity 104B because that marks the receipt of three items; subset 190B is generated responsive to receipt of the items 136H-J by activity 104B because that marks the receipt of another three items; and subset 190C is generated responsive to receipt of the item 136E by activity 104B because that marks the receipt of another three items). Thus, this illustrates that not only can items received by an activity at different times be combined into a subset (e.g., the items 136A, D, and G received at times T3.1 and T3.2 are in the same subset 190A), but also that all items received at the same time by an activity can be combined into a subset (e.g., the items 136H, I, and J received at times T4.1 are in the same subset 190B). Also, the action 130B of the activity 104B is started at time T4 before the activity 104A completes at T6. Also, the activity 104C receives items (subset 190A) before the activity 104A completes at T6. Again, the pipeline nature that can result from the catch and release policy mechanism is shown—e.g., at time T5, items 136A, D and G are at activity 104C, items 136H-J are at activity 104B, and items 136C and E are at activity 104A; similarly, at time T7, items 136H-J are at activity 104C and items 136N, C and E are at activity 104B.

Example Activities of Workflows

FIG. 1B is a block diagram illustrating part of another workflow according to some example implementations. Workflow 150 has at least one of its activity's activation policy not set to all. The campaign audience 152 is defined to include roughly 50 million (MM) contacts, which are the input set to a send activity 154A. The send activity 154A has an activation policy 156A whose set of criteria is: 1) schedule on: Thursday at 8 am; 2) activate after: not applicable (NA); and 3) a recurrence indicator: 0 times. As such, on Thursday at 8 am, the input set is provided to the action 158A of the activity 154A, which action causes an email to be sent to each member of the audience. As each email is sent to a member of the audience, that member will be passed on to a next activity. While FIG. 1D illustrates a workflow with 2 send activities, a workflow will typically include additional activities between the two send activities.

The send activity 154N has an activation policy 156N whose set of criteria is: 1) schedule on: not applicable (NA); 2) activate after: 1 hour; and 3) a recurrence indicator: 5 times. As such, a timer will be started when the first audience member is passed to the send activity 154N. When 1 hour has passed, all the audience members that have been received thus far will be "caught" as a first subset and passed on to the action 158N. If and when an additional audience member is received by the activity 154N, the timer will be restarted. Similarly, when 1 hour has passed, the additional audience member and all the audience members that have been received since are "caught" as a second subset and passed on to the action 158N. This process repeats the number of times indicated by the recurrence indicator—that is, 5 times. Thus, the audience group moves through the workflow based on the catch and release policy for the next activity (e.g., send activity 154N), whose action (e.g., 158N) is executed once the activation policy 156N is satisfied.

In addition, for each of the activities 154A and 154N, estimated operational information is caused to be displayed as respectively illustrated in block 159A and 159N. In FIG. 1B, the estimated operational outcome is expressed in the form of an estimated time of completion calculated from the start time (the time in the schedule on criteria of the activation policy 156A of the initial activity of the workflow (send activity 154A) based on how long it is estimated that each activity will take.

FIG. 1C is a block diagram illustrating part of another workflow according to some example implementations. Workflow 160 has at least one of its activity's activation policy not set to all. The campaign audience 162 is defined to include roughly 50 MM contacts, which are the input set to a send activity 164A. In addition, personalized messages content for Email, SMS and Push (not shown) is defined for the workflow 160.

The send activity 164A has an activation policy 166A whose set of criteria is: 1) schedule on: Thursday at 8 am; 2) activate after: not applicable (NA); and 3) a recurrence indicator: 0 times. As such, on Thursday at 8 am, the input set is provided to the action 168A of the activity 164A, which action causes an email to be sent to each member of the audience. As each email is sent to a member of the audience, that member will be passed on to a next activity, which in FIG. 1C is decision activity 164B.

The decision activity 164B has an activation policy 166B whose set of criteria is: 1) schedule on: not applicable (NA); 2) activate after: 60 minutes; and 3) a recurrence indicator: 24 times (the combination of activate after 60 minutes and repeat 24 times means this will take 24 hours or more). The activation policy 166B operates in similar fashion to the activation policy 156N, except it repeats 24 times. Thus, it may result in the formation of different subsets of audience members being passed on to the action 168B at different times. The action 168B of the decision activity 164B is a decision action based on whether the email sent has been opened. Thus, the action 168B again splits the received audience members into those who have opened the email (which exit the workflow) and those who have not (which are passed to a next activity—namely, a decision activity 164C).

The decision activity 164C has an activation policy 166C whose set of criteria is: 1) schedule on: not applicable (NA); 2) activate after: 0 minutes; and 3) a recurrence indicator: 0 times. The activation policy 166C is configured such that each time an audience member is received, it is provided to the action 168C. However, since it is expected that the activation policy 166B will result in subsets of audience members being formed, each subset will likely remain together when passed to the next activity (decision activity 164C) as long as: 1) the activity 164B is not designed to provide the items to the next activity a different way (e.g., individually); and 2) the action 168B is completed on the audience members in that subset at roughly the same time (some implementation use some amount of buffering to attempt or ensure that the subsets stay together when passed from the action 168B to the decision activity 164C). Assuming the subsets stay together, the action 168C will be performed on the audience members in each subset as a batch. In other words, if a prior activity batches and releases in batches, then a next activity may, depending on its configuration and the design of the prior activity, process in those same batches. The action 168C of the decision activity 164C is a decision action based on whether the audience member has a registered application contact. Thus, the action 168B splits the received audience members for which there is a registered application contact (which are passed to a next activity—namely, a send activity 164E) and those that do not (which are passed to a next activity—namely, a decision activity 164D).

The decision activity 164D has an activation policy 166D whose set of criteria is the same as that of activation policy 166C. Again, since it is expected that the activation policy 166B will result in subsets of audience members being formed, each subset may remain together (except those audience members that are split off and sent to send activity 164E) when passed to the next activity (decision activity 164C, and then decision activity 166C). Assuming the subsets stay together, the action 168D will be performed on the audience members in each subset as a batch. The action 168D of the decision activity 164D is a decision action based on whether the audience member has a registered SMS contact. Thus, the action 168D splits the received audience members into those for which there is a registered SMS contact (which are passed to a next activity—namely, a send activity 164F) and those who do not (which are passed to a next activity—namely, a send activity 164G).

Regarding the send activities 164E and F, they have the same criteria for their respective activation policies 166E and F (namely: 1) schedule on: not applicable (NA); 2) activate after: 2 hours; and 3) a recurrence indicator: 12 times), but different actions (namely, the action 168E sends a push message, while the action 168F sends an SMS message).

The send activity 164G has an activation policy 166G whose set of criteria is: 1) schedule on: NA; 2) activate after: 12 hours; and 3) a recurrence indicator: 2 times. The input subsets are provided to the action 168G of the activity 164G, which action causes an email to be sent to each member of the subsets. Thus, the catch happens every 12 hours for 2 times. This is used to control when the subgroups are processed. For example, if it is desired to granularly control when to send the SMS at a specific time-range.

For each of the activities 164A-N, estimated operational information is caused to be displayed as respectively illustrated in block 169A-G. In FIG. 1C, the estimated operational outcome is expressed in the form of an estimated time of completion calculated from the start time (the time in the schedule on criteria of the activation policy 166A of the initial activity of the workflow (send activity 164A) based on how long it is estimated that each activity will take.

FIG. 1D is a block diagram illustrating another workflow according to some example implementations. Workflow 170 includes similar items as those in workflow 150, except the activation policy 176 has activate after and recurrence set to NA and 0 times while the activation policy 156 is 1 hour and 5 times. Thus, workflow 170 has all catch(es) set to All and the audience group moves through the workflow's flow of activities together (all members of the group move from one activity to the next at the same time; in other words, the group moves as a whole from one activity to the next and is not broken into sub-groups). As such, the next activity is not executed until the entire audience group completes the prior activity.

Thus, a workflow in which the catch for every activity is set to all results in a workflow that operates like a workflow in a typical bulk type workflow tool. Alternatively, a workflow with an input set of 1 and the catch for every activity set to all results in a workflow that operates like a typical singleton type workflow tool.

Generating a Workflow

Figure 2A:
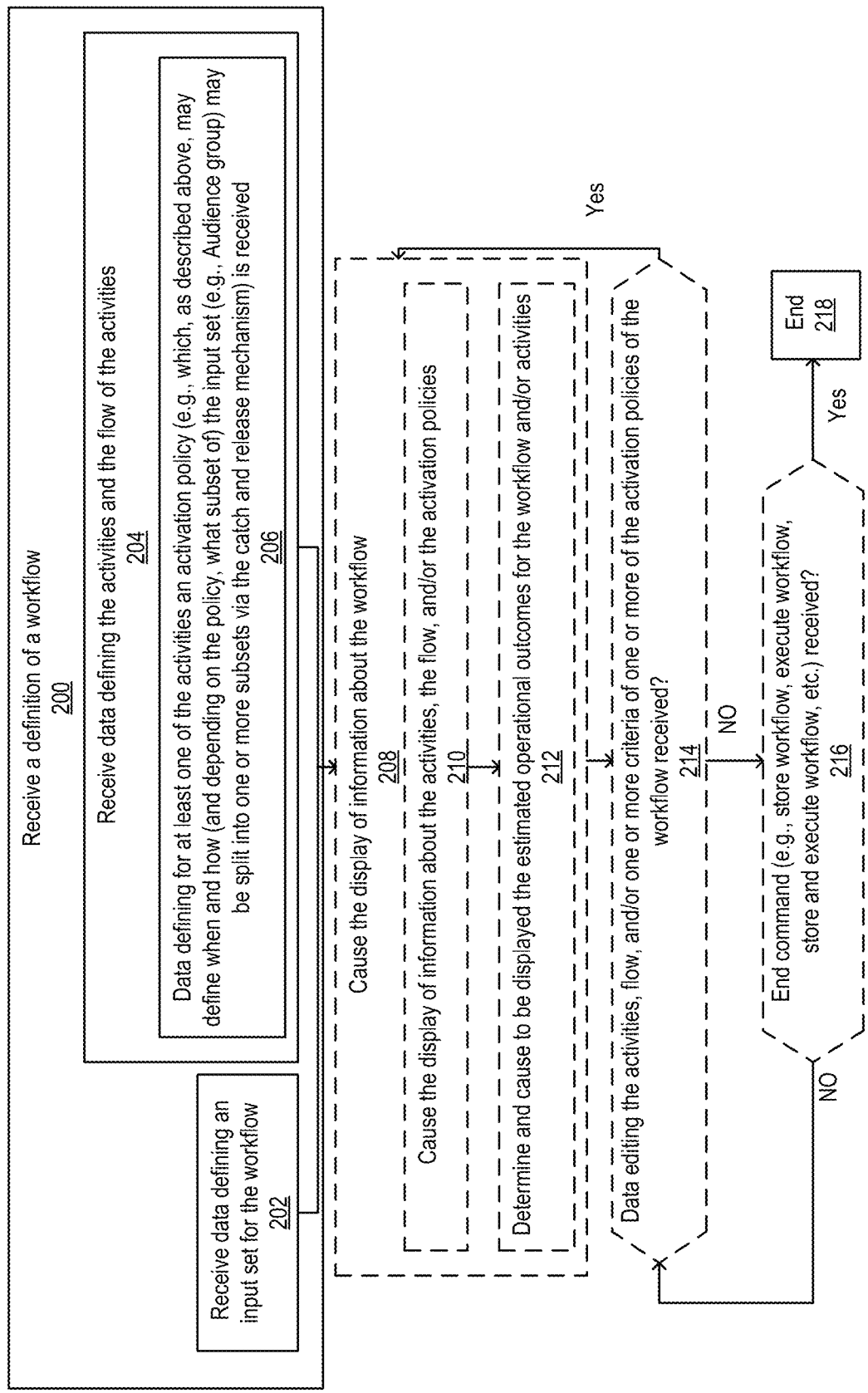
FIG. 2A is a flow diagram illustrating the generating of a workflow according to some exemplary implementations.

FIG. 2A is a flow diagram illustrating the generating of a workflow according to some implementations. In block 200, a workflow tool receives a definition of a workflow. Different implementations may support the receipt of data defining a workflow in different ways, such as via an application programming interface (API) and/or a GUI interface. In implementations that provide a graphical user interface (GUI) for building workflows, that GUI may take a variety of forms including: 1) one that looks like FIGS. 1B-1D; 2) a modified version of the GUI provided by existing workflow tools such as Journey Builder by Salesforce.com Inc., where the modification includes the ability to edit (and optionally add) activation policies (and thus criteria for those activation policies) to one or more activities of a workflow. Thus, in some implementations, a known manner of defining activities and the flow of activities is modified to accommodate the policy Driven Catch and Release Mechanism for activities in the workflow tool.

The definition of the workflow may include a variety of parts which, in some implementations, may be entered in a different order that shown in FIG. 2A. In block 202, data defining an input set for the workflow is received. The input set can be defined based on accessing items from a set of one or more sources. For example, in a workflow for a marketing campaign: 1) the sources may include a contacts database, a data management platform (DMP), Google data along with Email Studio Date Extension (DE), Automation Studio and Bulk API Events; and 2) the input set may be an audience group based upon contacts from those sources of contacts. In some implementations the "catch and release" mechanism is supported for all activities in the workflow tool because there are decision activities that make batch API calls (e.g., check if email is opened).

In block 204, data defining the activities and the flow of the activities is received.

In block 206, data defining an activation policy for at least one of the activities (e.g., which, as described above, may define when and how (and depending on the policy, what subset of) the input set (e.g., Audience group) may be split into one or more subsets via the catch and release mechanism) is received.

In optional block 208, the workflow tool causes the display of information about the workflow.

In optional block 210, the workflow tool causes the display of information about the activities, the flow, and the activation policies.

In optional block 212, the workflow tool determines and causes to be displayed the estimated operational outcomes as discussed above.

In optional block 214, data editing the activities, flow, and/or one or more criteria of one or more of the activation policies of the workflow is received. Thus, the "catch and release" provides granular control at the activity level for the workflow builder (e.g., marketer) to configure when and how to group the items (e.g., audience) and when to process the action on and move those groups to the next activity. Further, the provision of the estimated operational outcomes and the ability to edit the activation policies, enables a workflow builder to edit one or more criteria of one or more of the activation policies in an effort to have the execution outcome of the workflow meet one or more desired outcomes.

In block 216, it is determined if an end command (e.g., store workflow, execute workflow, store and execute workflow, etc.) is received. If not, control passes back to block 200; otherwise, the flow diagram ends at block 218.

Executing a Workflow

Figure 2B:
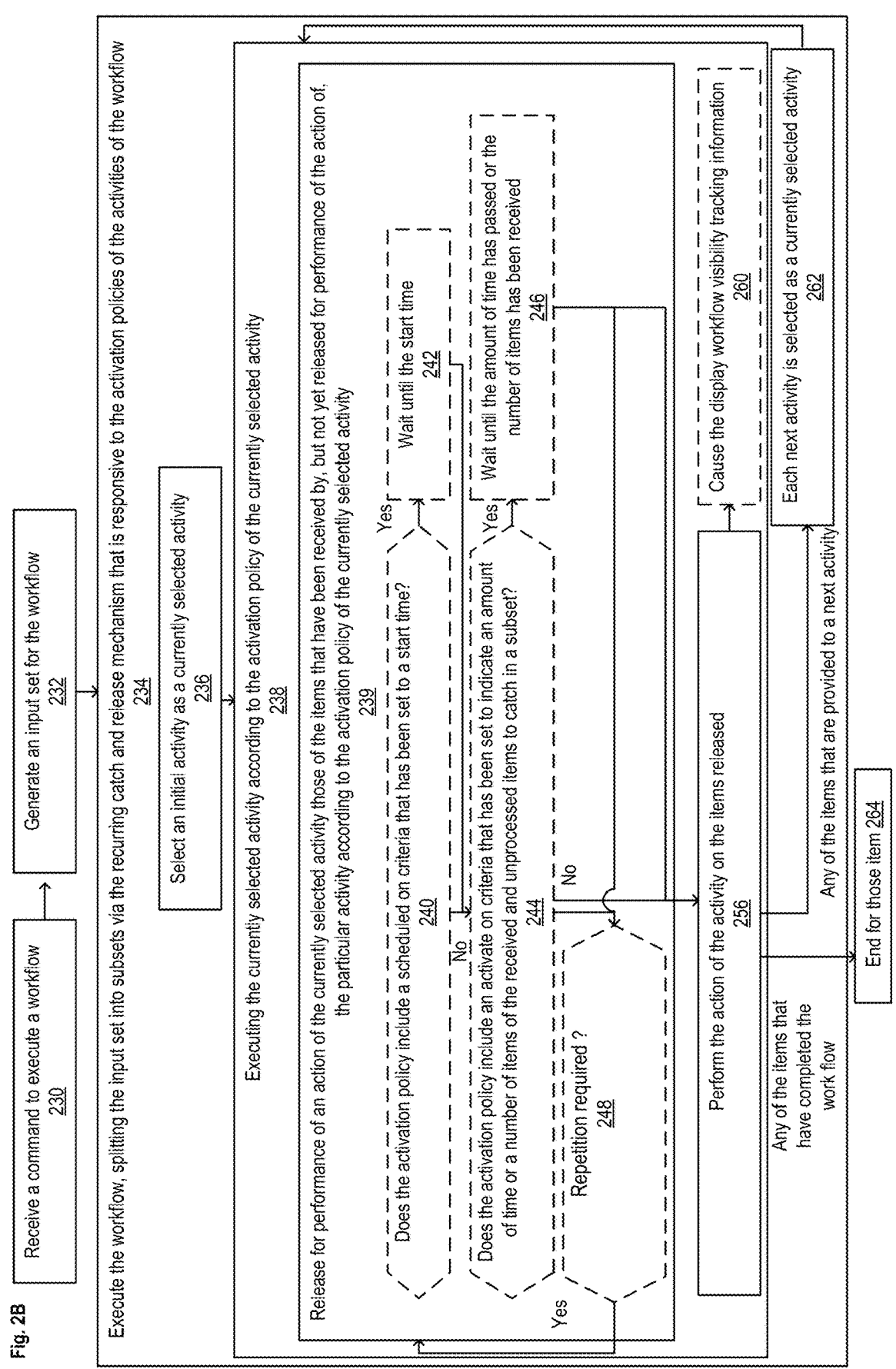
FIG. 2B is a flow diagram illustrating the executing of a workflow according to some exemplary implementations.

FIG. 2B is a flow diagram illustrating the executing of a workflow according to some implementations. In block 230, a command is received to execute a workflow.

In block 232, the input set for the workflow is generated from a set of one or more sources. The item entry event consumes and combines items from the items sources into a single unit for the workflow. For example, in a workflow for a marketing campaign: 1) the sources may include Contact Audience, DMP and Google data along with Email Studio DE, Automation Studio and Bulk API Events; and 2) the input set may be an audience group based upon contacts from those sources of contacts.

In block 234, the workflow is executed, including splitting the input set into subsets via the recurring catch and release mechanism that is responsive to the activation policies of the activities of the workflow.

In block 236, an initial activity is selected as a currently selected activity.

In block 238, the currently selected activity is executed according to the activation policy of the currently selected activity.

In block 239, those of the items that have been received by, but not yet released for performance of the action of, the particular activity are released for performance of the action of the currently selected activity according to the activation policy of the currently selected activity. Based on the activation policy of the currently selected activity, the items (e.g., audience members) that will be received by the activity may be effectively split into subsets ("catch") and provided ("released") for processing by the action of the activity and sending to a next activity.

In dashed block 240, it is determined if the activation policy includes a scheduled on criteria that has been set to a start time. If not, control passes to block 244. If so, control passes to block 242 in which a wait until the start time is performed before control passes to block 244.

In dashed block 244, it is determined if the activation policy includes an activate on criteria that has been set to indicate an amount of time or a number of items of the received and unprocessed items to catch in a subset. If not, control passes to both blocks 248 and 256. If so, control passes to block 246 in which a wait until the amount of time has passed or the number of items has been received before control passes to both blocks 248 and 256.

In dashed block 248, it is determined if repetition is required based on any repetitions already performed and on the activation policy including a recurrence indicator that has been set to indicate a number of recurrences. If repetition is required, control passes to block 240. If not, no repetition is performed.

In block 256, the action of the activity is performed. Those items, if any, that are to be provided to appropriate ones of a set of one or more next activities are passed to block 262, in which each such next activity is selected as a currently selected activity and control passed to block 238. Those items, if any, that have completed the workflow are passed to block 264 where the workflow ends for those items.

Optionally, control also passes from block 256 to dashed block 260, in which workflow visibility tracking information is determined and caused to be displayed. Since the audience moves through the workflow activities in batches/groups, in some implementations the workflow tool provides before and after visibility tracking information for each batch workflow activity with granular reporting of the audience in the batch activity. For example, in some implementations the workflow tool provides granular visibility into the input set and output subsets from before and after each activity. This means that if the action of an activity is executed X times on X different subsets (also referred to as X "passes" through the workflow activity), the workflow tool provides separate reporting for each of the "passes" through the workflow activity, resulting in X reports indicating the subset (e.g., audience entry) into the batch performance of the action and the outcome of the action. For example, if a workflow is recurring regularly (e.g., a campaign every Friday), then the user is provided tracking detail for this one occurrence vs another (e.g., Friday's email activity vs. last Friday's). Additionally, or alternatively, some implementations of the workflow tool provide reports/tracking of the items (e.g., with an audience, detail contact info) that dropped from each activity after the activity has expired/exited. Additionally, or alternatively, some implementations of the workflow tool provide an aggregated point in time report regarding the outcome of the entire workflow regardless of whether the workflow is still active or completed.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Platform as a Service (PAAS), one set of tenants may be third party application developers providing applications/services and another set of tenants may be customers of different ones or all the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS) .Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
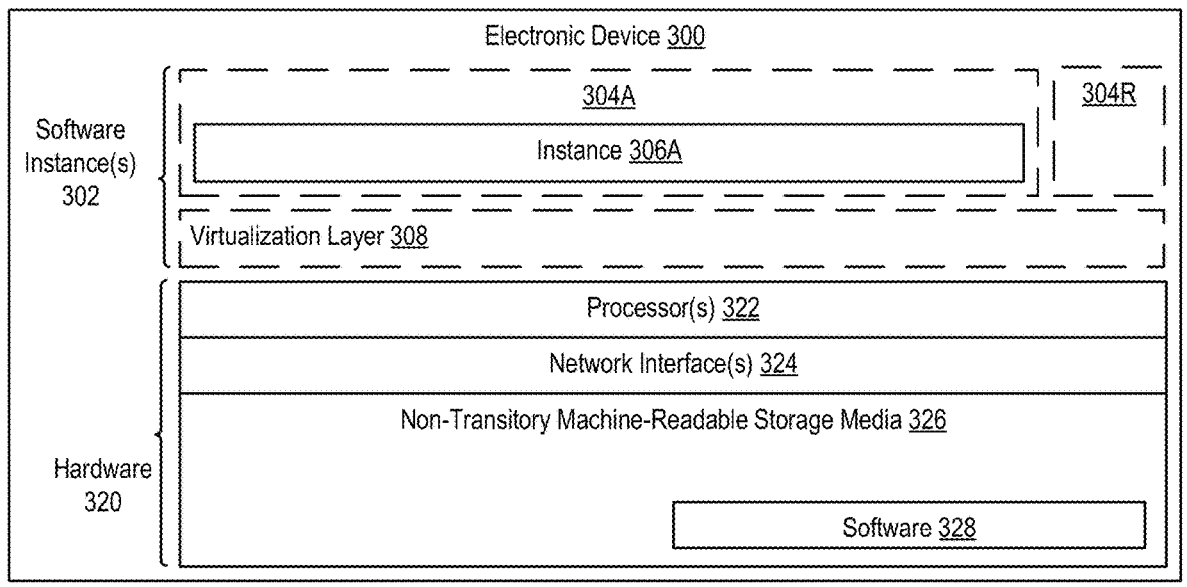
FIG. 3A is a block diagram illustrating an electronic device according to some exemplary implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described end user clients and the workflow tool (which may also be referred to as a workflow tool service) may be implemented in one or more electronic devices 300. In one implementation: 1) each of the end user clients is implemented in a separate one of the electronic devices 300 (e.g., in user electronic devices operated by users where the software 328 represents the software to implement end user clients to interface with the workflow tool service (e.g., a web browser, a native client, a portal, a command-line interface, and/or an application program interface (API) based upon protocols such as Simple Object Access Protocol (SOAP), Representational State Transfer (REST), etc.)); 2) the workflow tool service is implemented in a separate set of one or more of the electronic devices 300 (e.g., a set of one or more server electronic devices where the software 328 represents the software to implement the workflow tool service); and 3) in operation, the electronic devices implementing the end user clients and the workflow tool service would be communicatively coupled (e.g., by a network) and would establish between them (or through one or more other layers) connections (e.g., in the case of the workflow tool service providing a GUI, the connections enable the workflow tool service to transmit information to the end user clients to be displayed and the end user clients to submit definitions and/or commands to the workflow tool service. Other configurations of electronic devices may be used in other implementations (e.g., an implementation in which the end user client and the workflow tool service are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 3B:
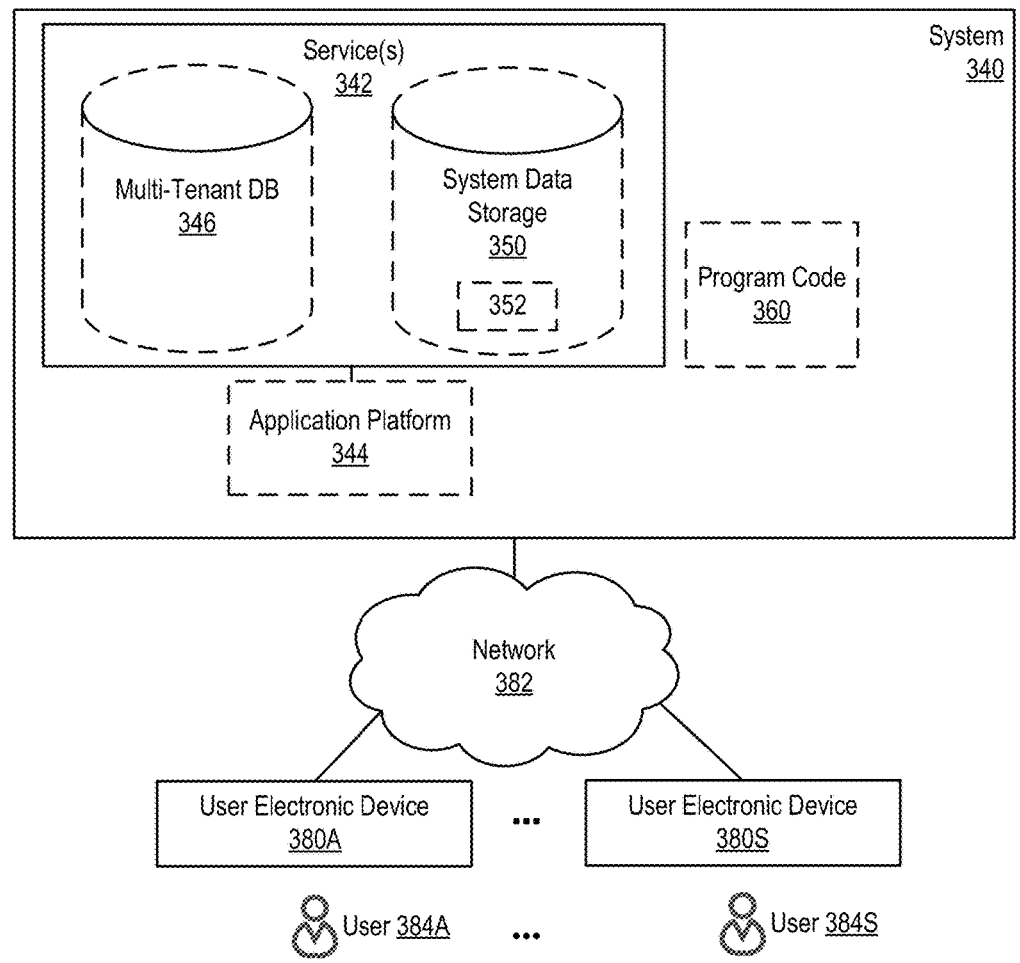
FIG. 3B is a block diagram of an environment where a workflow tool service may be deployed, according to some exemplary implementations.

FIG. 3B is a block diagram of an environment where a workflow tool service may be deployed, according to some implementations. A system 340 includes hardware (a set of one or more electronic devices) and software to provide service(s) 342, including the workflow tool service. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communicate with each other and/or with one or more of the user electronic devices 380A-S via one or more Application Programming Interface(s) (APIs) (e.g., a Representational State Transfer (REST) API). The user electronic devices 380A-S are operated by users 384A-S.

In one implementation, the system 340 is a multi-tenant cloud computing architecture supporting one or more services, such the workflow tool service. In some implementations, the one or more services include a marketing service (e.g., Marketing Cloud, Salesforce DMP, and Pardot by salesforce.com, Inc.) and/or a commerce service (e.g., Commerce Cloud Digital, Commerce Cloud Order Management, and Commerce Cloud Store by salesforce.com, Inc.) that are modified to provide the workflow tool service. Additionally or alternatively, the one or more services include one or more of a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may utilize one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the workflow tool service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

Exemplary System

Figure 4:
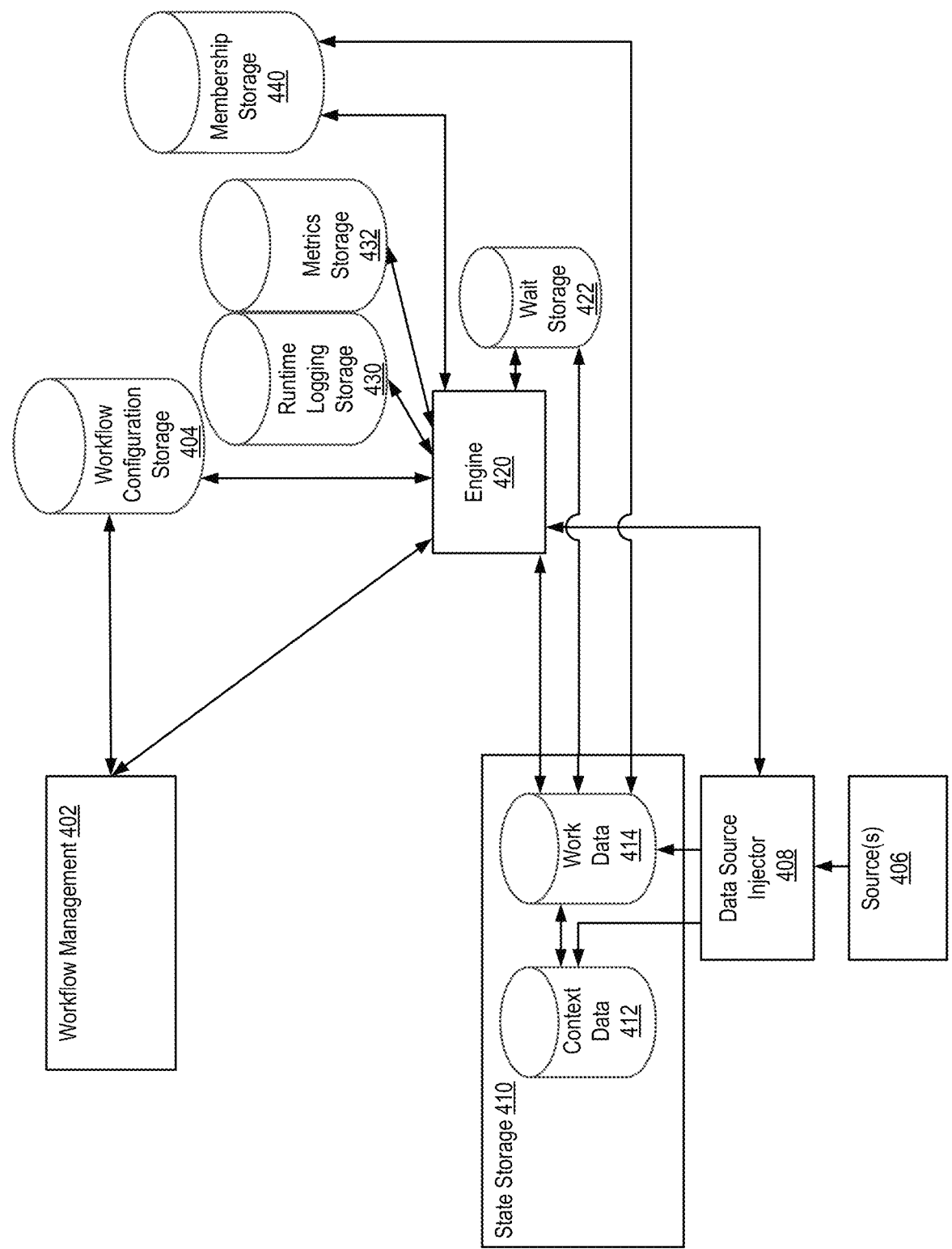
FIG. 4 is a block diagram of an exemplary system that implements the workflow tool or workflow tool service according to some exemplary implementations.

FIG. 4 is a block diagram of an exemplary system that implements the workflow tool or workflow tool service according to some implementations. While the exemplary system of FIG. 4 may be implemented within the exemplary environment of FIG. 3B (e.g., in the system 340), it may also be implemented in other environments (e.g., as a standalone). Workflow management 402 provides the API and/or GUI to users to build (including the ability to set activation policies on activities and optionally cause to be displayed estimated operational outcomes), execute, and see the execution results (e.g., optionally cause to be displayed workflow visibility tracking information) of workflows. The workflows are stored in workflow configuration storage 404.

The engine 420 executes the activities of the workflows stored in the workflow configuration storage 404 responsive to execution commands from the workflow management 402. The engine 420 causes a data source injector 408 to inject into state storage 410 data, including the items that will be processed through the workflows, from a set of one or more source(s) 406. The source(s) 406 may include any sources that can provide items to be processed through the workflows. In the context of a marketing campaign, the sources may include contacts and optionally data to personalize message to be sent out in the campaign (see above described examples of sources).

The engine 420 receives from the state storage 410 the items (e.g., the contacts), stores back into the state storage data indicating the currently selected activities (that is, where in the workflows processing has progressed to), the data required to make decisions, and other data the engine 420 is working with to execute the activities. In one implementation, the state storage 410 includes: 1) a context data storage 412 to store the data indicating the currently selected activities (that is, where in the workflows processing has progressed to) and the data required to make decisions; and 2) a work storage 414 to store the items (e.g., contacts) and the other data the engine 420 is working with to execute the activities.

The engine 420 optionally interfaces with a wait storage 422 used to address activities that require waiting an amount of time.

The engine 420 also optionally interfaces with runtime logging storage 430 to store runtime logs. The engine 420 interfaces with membership storage 440 to store an indication of what happened to different ones of the items after execution of a workflow. In addition, the engine 420 also optionally interfaces with metrics storage 432 to store data regarding the execution of workflows. The engine 420 can use data from the membership storage 440 and/or the metrics storage to provide the data to the workflow management 402 to cause the workflow visibility tracking information to be displayed. The engine 420 can use data from the data source injector 408 and metrics storage 432 to provide the data to the workflow management 402 to cause the estimated operational outcomes to be displayed.

Thus, in some implementations, the workflow management 402, engine 420, and data source injector 408 perform the operations shown in FIG. 2A, and the engine 420, and data source injector 408 perform the operations in FIG. 2B. While one system for implementing the workflow tool or workflow tool services has been described, alternative implementations will be evident to one of ordinary skill in the art in view of what is described above. Thus, the system of FIG. 4 is exemplary.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. An article of manufacture comprising:
a non-transitory machine-readable storage medium that provides instructions that, if executed by a machine, will cause the machine to perform operations comprising:
receiving a definition of a workflow, wherein the receiving includes:
receiving first data defining an input set of items for the workflow; and
receiving second data defining activities and a flow of the activities for the workflow, wherein the second data includes an activation policy for at least a particular activity of the activities, wherein each of the activities includes an action to be performed responsive to each of the set of items provided to that activity, wherein the flow and activation policy control how each of the input set of items is to be moved through the workflow;
determining and causing to be displayed on a graphical user interface (GUI) an estimated operational outcome for the workflow and/or each of the activities, wherein the estimated operational outcome is an estimate of an outcome that would result if a machine were to perform the actions of those of the activities required for the input set of items to be moved through the workflow according to the control of the flow and the activation policy;
receiving, from the GUI, data identifying edits to the activation policy; and
responsive to the edits, determining and causing to be displayed an updated version of the estimated operational outcome for the workflow and/or each of the activities.

2. The article of manufacture of claim 1, wherein the activation policy includes a set of one or more criteria that includes a scheduled on time.

3. The article of manufacture of claim 1, wherein the activation policy includes a set of one or more criteria that includes an amount of time to wait before performing an action of the activity.

4. The article of manufacture of claim 1, wherein the activation policy includes a set of one or more criteria that includes a number of items that must be received before performing an action of the activity.

5. The article of manufacture of claim 1, wherein the activation policy includes a recurrence indicator that has been set to indicate a number of times to repeat.

6. The article of manufacture of claim 1, wherein the flow of the activities includes a set of one or more paths that each involves a different series of at least some of the activities.

7. A machine-implemented method comprising:
receiving a definition of a workflow, wherein the receiving includes:
   receiving first data defining an input set of items for the workflow; and
   receiving second data defining activities and a flow of the activities for the workflow, wherein the second data includes an activation policy for at least a particular activity of the activities, wherein each of the activities includes an action to be performed responsive to each of the set of items provided to that activity, wherein the flow and activation policy control how each of the input set of items is to be moved through the workflow;
determining and causing to be displayed on a graphical user interface (GUI) an estimated operational outcome for the workflow and/or each of the activities, wherein the estimated operational outcome is an estimate of an outcome that would result if a machine were to perform the actions of those of the activities required for the input set of items to be moved through the workflow according to the control of the flow and the activation policy;
receiving, from the GUI, data identifying edits to the activation policy; and
responsive to the edits, determining and causing to be displayed an updated version of the estimated operational outcome for the workflow and/or each of the activities.

8. The machine-implemented method of claim 7, wherein the activation policy includes a set of one or more criteria that includes a scheduled on time.

9. The machine-implemented method of claim 7, wherein the activation policy includes a set of one or more criteria that includes an amount of time to wait before performing an action of the activity.

10. The machine-implemented method of claim 7, wherein the activation policy includes a set of one or more criteria that includes a number of items that must be received before performing an action of the activity.

11. The machine-implemented method of claim 7, wherein the activation policy includes a recurrence indicator that has been set to indicate a number of times to repeat.

12. The machine-implemented method of claim 7, wherein the flow of the activities includes a set of one or more paths that each involves a different series of at least some of the activities.

* * * * *